United States Patent
Osaki et al.

(10) Patent No.: US 7,634,955 B2
(45) Date of Patent: Dec. 22, 2009

(54) METHOD OF CONTROLLING DRIVE OF DRIVING MOTOR FOR ROTARY INDEXING DEVICE OF MACHINE TOOL

(75) Inventors: Haruo Osaki, Kanazawa (JP); Takeshi Yonenaga, Kanazawa (JP)

(73) Assignee: Tsudakoma Kogyo Kabushiki Kaisha, Kanazawa-Shi (JP)

(*) Notice: Subject to any disclaimer, the term of this patent is extended or adjusted under 35 U.S.C. 154(b) by 245 days.

(21) Appl. No.: 11/946,494

(22) Filed: Nov. 28, 2007

(65) Prior Publication Data

US 2008/0125904 A1 May 29, 2008

(30) Foreign Application Priority Data

Nov. 29, 2006 (JP) ............................. 2006-320979

(51) Int. Cl.
- B23B 29/24 (2006.01)
- B23Q 16/02 (2006.01)
- B23Q 17/00 (2006.01)
- G06F 19/00 (2006.01)
- B23Q 5/10 (2006.01)
- B23Q 5/28 (2006.01)
- H02K 17/32 (2006.01)
- H02K 23/68 (2006.01)
- H02K 27/30 (2006.01)
- H02P 29/04 (2006.01)
- B25B 1/22 (2006.01)

(52) U.S. Cl. ............ 74/819; 74/813 C; 74/813 L; 700/193; 318/39; 318/433; 269/73

(58) Field of Classification Search ............... 700/159, 700/170, 193; 409/61, 221, 224; 318/3–5, 318/34, 35, 39, 115, 432, 433; 269/71, 73, 269/289 R, 294; 74/490.08, 495, 496, 813 R, 74/813 C, 813 L, 815–817, 819; 73/1.75, 73/1.79

See application file for complete search history.

(56) References Cited

U.S. PATENT DOCUMENTS

| | | | | |
|---|---|---|---|---|
| 4,274,773 A | * | 6/1981 | Burkhardt et al. | 409/221 |
| 4,559,798 A | * | 12/1985 | Hayashi et al. | 72/81 |
| 4,636,960 A | * | 1/1987 | McMurtry | 700/193 |
| 5,234,081 A | * | 8/1993 | Watanabe | 188/74 |
| 6,453,773 B1 | * | 9/2002 | Mochizuki et al. | 74/813 C |

(Continued)

FOREIGN PATENT DOCUMENTS

JP 08255022 A * 10/1996

Primary Examiner—Crystal J Barnes-Bullock
(74) Attorney, Agent, or Firm—Westerman, Hattori, Daniels & Adrian, LLP

(57) ABSTRACT

A method of controlling drive of a driving motor for a rotary indexing device is provided. The device includes an indexing mechanism that indexes an angular position of a circular table by rotating the circular table with the use of the driving motor as a driving source, a clamping mechanism that holds the indexed angular position, and a control unit that controls drive of the driving motor by position control. In the method, the control unit controls the drive of the driving motor during operation of the clamping mechanism with a content of control in which an output torque of the driving motor by the position control becomes smaller than an output torque by the position control during indexing of the angular position of the circular table for an equivalent positional deviation.

12 Claims, 6 Drawing Sheets

U.S. PATENT DOCUMENTS

| | | | |
|---|---|---|---|
| 6,941,646 B2 * | 9/2005 | Suhara | 29/740 |
| 6,999,835 B2 * | 2/2006 | Kodama | 700/121 |
| 7,096,751 B2 * | 8/2006 | Yagami | 73/865.8 |
| 7,448,295 B2 * | 11/2008 | Omori | 74/490.08 |

* cited by examiner

METHOD OF CONTROLLING DRIVE OF DRIVING MOTOR FOR ROTARY INDEXING DEVICE OF MACHINE TOOL

BACKGROUND OF THE INVENTION

1. Field of the Invention

The present invention is applied to angular indexing devices of machine tools, or to a rotary indexing device including an indexing mechanism that indexes an angular position of a circular table by rotating the circular table with the use of a driving motor as a driving source, a clamping mechanism that holds the indexed angular position, and a control unit that controls drive of the driving motor by position control. In particular, the present invention relates to a method of controlling the driving motor during operation of the clamping mechanism of the rotary indexing device.

2. Description of the Related Art

For example, Japanese Unexamined Patent Application Publication No. 10-29125 discloses a rotary indexing device of a machine tool to which the present invention is applied. The rotary indexing device disclosed in the publication has a table (circular table) rotatably supported at a base, and an indexing mechanism that indexes the angular position of the table by rotating the table. A typical indexing mechanism has a worm wheel concentrically fixed at the table, and a worm meshing with the worm wheel and rotated by a rotary drive device (for example, a driving motor, or a servomotor). The publication also discloses that the indexing mechanism employs a direct-drive driving motor composed of a motor rotor fixed at the table, and a motor stator fixed at the base to rotate the motor rotor.

Also, a rotary indexing device like one mentioned above typically has a clamping mechanism that holds the indexed angular position of the circular table. The rotary indexing device disclosed in the publication has a clamp ring as the clamping mechanism. The clamp ring is fixed at the base and has a clamping surface facing the circumferential surface of the circular table. The clamp ring is deformed in a diameter-contraction direction because of the action of pressure fluid or the like, so that a clamping force of the clamp ring inhibits the circular table from rotating relative to the clamp ring, so as to hold the angular position of the circular table. In many cases, the angular position of the circular table is held when a workpiece mounted on the circular table is processed.

When the workpiece is processed, a large load may be applied to the circular table through the workpiece. The load may act as a force in a direction to rotate the circular table. As a result, the circular table may rotate although the clamping force of the clamping mechanism acts on the circular table. Due to this, the indexed angular position of the circular table may be deviated. Such a deviation of the angular position may be also caused by torsion of a driving system.

The deviated angular position of the circular table may cause the rotational position (phase) of the driving motor as the driving source for the indexing mechanism to be deviated from a target rotational position. In the rotary indexing device in which the drive of the driving motor is controlled by the position control (servo control), when a deviation is generated at the rotational position of the driving motor as described above, the position control performs control for restoring the deviated angular position of the circular table to a correct position. Also, regarding the related art, the position control during clamping is performed with the same content of control as that during indexing the angular position of the circular table (hereinafter, referred to as "angular indexing").

However, since the clamping force of the clamping mechanism acts on the indexing mechanism during the processing of the workpiece, the clamping force may act on the driving motor as a load when the indexing mechanism is driven. Accordingly, if the position control for restoring the deviated angular position to the correct position with the same content of control as that for angular indexing with a high responsibility, the driving motor may become an overload state. When the overload state of the driving motor is detected, the state is determined as an abnormal state and a stop signal is generated. With the stop signal, the rotary indexing device and the machine tool may be stopped and the processing of the workpiece may be interrupted. The processing of the workpiece may be frequently interrupted, which degrades the efficiency of processing.

The above-described problem may occur not only when the angular position of the circular table is deviated during processing of the workpiece (in a clamping state), but also depending on the operation timing of the clamping mechanism during angular indexing. In particular, when the driving motor is rotated by the servo control to the target angular position so as to index the angular position of the circular table, the operation timing of the clamping mechanism does not correspond to a timing in which the positional deviation becomes zero, and typically has a certain tolerance concerning an imposition width. Accordingly, a condition may be conceived that the clamping force acts on the indexing mechanism before the positional deviation becomes zero. Such a condition may cause the overload state as described above.

To prevent the interruption of the processing of the workpiece, the position control of the driving motor may be turned OFF during clamping of the circular table. In such a case, even if the angular position is deviated from a desired angular position, the processing may be continued with the deviated angular position, thereby causing a processing failure of the workpiece.

SUMMARY OF THE INVENTION

Accordingly, an object of the present invention is to provide a method of controlling drive of a driving motor for a rotary indexing device of a machine tool. The method does not cause a processing failure of a workpiece, and prevents the driving motor from becoming an overload state during control of the driving motor to a target rotational position even when a rotational position of the driving motor is deviated from the target position while an angular position of a circular table being held.

A method of controlling drive of a driving motor for a rotary indexing device of a machine tool is provided as an aspect of the present invention. The rotary indexing device includes a control unit that controls the drive of the driving motor. During operation of the clamping mechanism, the control unit controls the drive of the driving motor with a content of control in which an output torque of the driving motor by the position control becomes smaller than an output torque by the position control during angular indexing for an equivalent positional deviation.

With such a configuration, since the drive of the driving motor is controlled to the target rotational position by the position control for the driving motor even when the angular position of the circular table (rotational position of the driving motor) held by the clamping mechanism is deviated from the target angular position (rotational position), or even when the angular position of the circular table is deviated from the target angular position during the operation of the clamping mechanism, a processing failure caused by the deviated angular position can be prevented from occurring. Also, since the drive of the driving motor is controlled by switching the content of control from one with a high responsibility for angular indexing, to one with a small torque command value to be output, the output torque can be reduced, and the driving motor does not become an overload state. Therefore, even when the angular position is deviated, processing is not interrupted due to the deviation, thereby effectively preventing the efficiency of processing from being degraded.

DESCRIPTION OF THE PREFERRED EMBODIMENTS

Embodiments of the present invention are described below with reference to the drawings.

Figure 1:
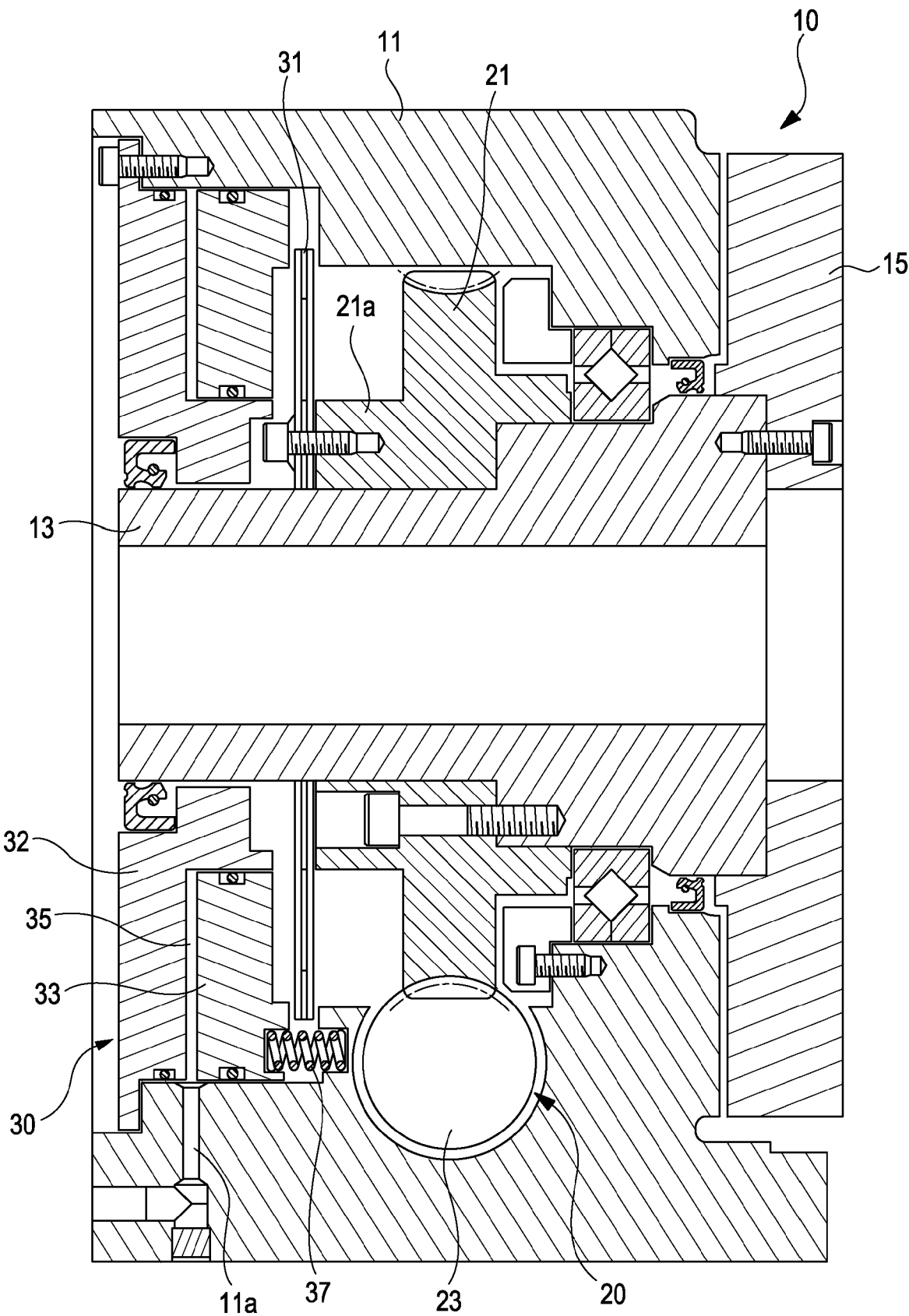
FIG. 1 is a lateral cross-sectional view showing a rotary indexing device of a machine tool to which the present invention is applied.
Figure 2:
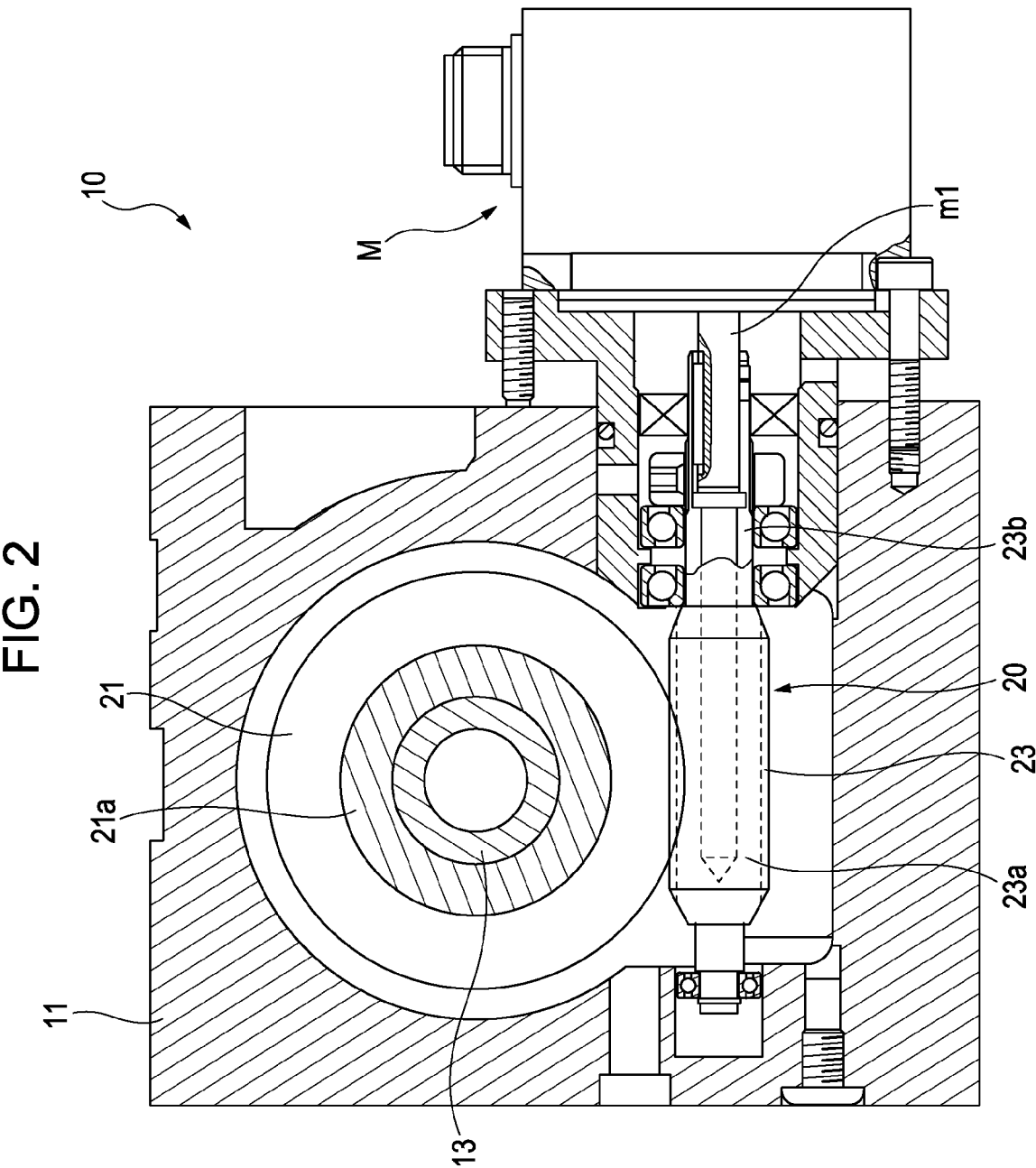
FIG. 2 is a vertical cross-sectional view showing the rotary indexing device of the machine tool to which the present invention is applied.

FIGS. 1 to 4 each show an embodiment of the present invention. FIGS. 1 and 2 each illustrate an index table 10 as a rotary indexing device of a machine tool to which the present invention is applied. The index table 10 includes a main shaft 13, a circular table 15, an indexing mechanism 20, and a clamping mechanism 30. The main shaft 13 is rotatably supported by a frame 11 with a bearing interposed therebetween. The circular table 15 is fixed at an end of the main shaft 13 by a plurality of screws arranged in a circumferential direction. The indexing mechanism 20 indexes the angular position of the circular table 15 by rotating the main shaft 13. The clamping mechanism 30 holds the indexed angular position of the circular table 15.

In the illustrated embodiment, the indexing mechanism 20 employs a worm gear mechanism. The indexing mechanism 20 has a worm wheel 21 fixed to the main shaft 13 non-rotatably relative to the main shaft 13, and a worm 23 meshing with the worm wheel 21.

The worm wheel 21 has a boss 21a. A plurality of screws arranged in a circumferential direction are screwed to the boss 21a, so that the worm wheel 21 is attached to the main shaft 13 non-rotatably relative to the main shaft 13. The worm 23 is rotatably supported by the frame 11 by a plurality of bearings arranged along the axis of rotation of the worm 23. The worm 23 has a worm portion 23a and a shaft portion 23b. The worm portion 23a meshes with the worm wheel 21. The shaft portion 23b is coupled to an output shaft m1 of a servomotor (driving motor) M attached to a side surface of the frame 11. The rotation of the output shaft m1 is transmitted to the worm wheel 21 via the shaft portion 23b and the worm portion 23a, and thus, the main shaft 13 and the circular table 15 are rotated.

The indexing mechanism of the rotary indexing device to which the present invention is applied is not limited to the above configuration that employs the worm gear mechanism. The indexing mechanism may employ a direct-drive driving motor composed of a motor rotor and a motor stator arranged in the frame 11. The motor rotor is fixed to the outer circumferential surface of the main shaft 13 non-rotatably relative to the main shaft 13. The motor stator is fixed to the frame 11 and arranged to surround the motor rotor.

In the illustrated embodiment, the clamping mechanism 30 employs the disc clamp system. The clamping mechanism 30 includes a clamp disc 31 attached to the boss 21a of the worm wheel 21 by a plurality of screws arranged in a circumferential direction non-rotatably relative to the boss 21a, and a pressing unit configured to press the clamp disc 31 to the frame 11 and clamping the clamp disc 31 with the frame 11 to generate a braking force (clamping force).

The pressing unit includes a fixed member 32 fixed to the frame 11 and also serving as a rear cover of the frame 11, and a ring piston member 33 fitted into a ring space 35 defined between the fixed member 32 and the frame 11, in a movable manner in the axial direction of the main shaft 13. A plurality of compression springs 37 are arranged in a circumferential direction between the piston member 33 and the frame 11. The piston member 33 is normally biased to the fixed member 32 with a biasing force of the compression springs 37. The frame 11 has a fluid supply channel 11a. The above-mentioned space 35, that is, the ring space 35 defined between the fixed member 32 and the piston member 33 is supplied with pressure fluid (for example, pressure oil) through the fluid supply channel 11a.

In the clamping mechanism 30 with the above configuration, by supplying the space 35 with the pressure fluid, the piston member 33 is pushed to the clamp disc 31 against the biasing force of the compression springs 37 to clamp the clamp disc 31 with the frame 11. This clamping force acts as a braking force against the rotation of the clamp disc 31, and hence, the clamp disc 31 becomes non-rotatable. As a result, the indexing mechanism 20 to which the clamp disc 31 is fixed becomes non-rotatable, and the angular position of the main shaft 13 and circular table 15 is held.

The clamping mechanism for the rotary indexing device to which the present invention is applied is not limited to the above configuration of the disc clamp system. For example, the clamping mechanism may employ a clamp sleeve that surrounds the main shaft 13 and has a circular groove provided at the circumferential surface thereof for defining a pressure chamber provided between the sleeve and the frame and the like. The pressure chamber is supplied with pressure fluid, so that the clamp sleeve is deformed in a diameter-contraction direction and thus the main shaft 13 becomes non-rotatable. Alternatively, the clamping mechanism may employ a configuration in which the circular table 15 is provided rotatably in the axial direction of the main shaft 13, and the circular table 15 is pressed to the frame 11 by using the action of pressure fluid or the like, so as to inhibit the circular table 15 from rotating.

Figure 3:
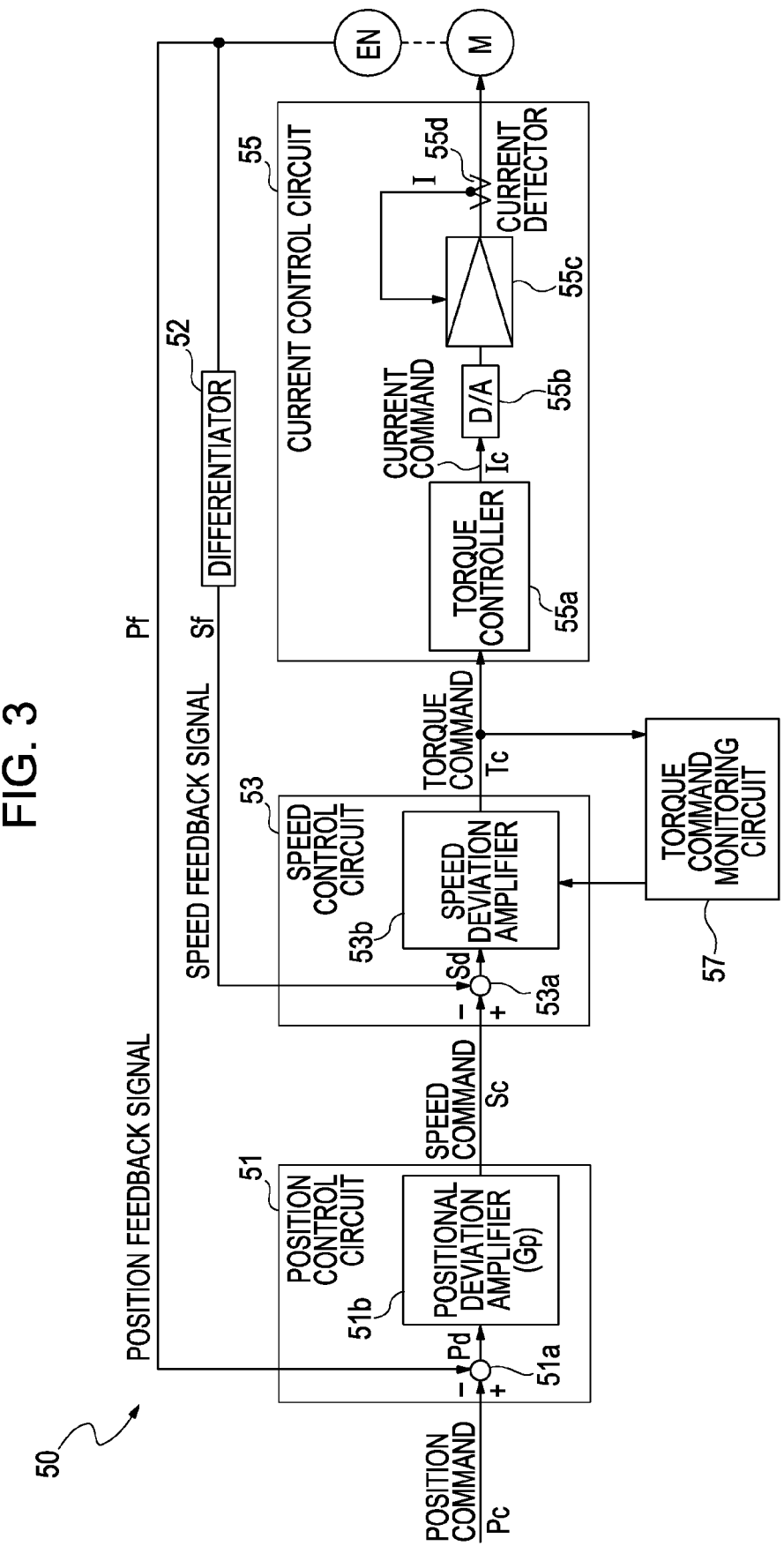
FIG. 3 is a block diagram showing a control unit for implementing an embodiment of the present invention.

In the index table 10 with the above configuration, a control unit 50 shown in FIG. 3 controls the drive of the servomotor M as the driving motor, which is a driving source for the indexing mechanism 20. The control unit 50 controls the drive of the servomotor M by position control. The control unit 50 is mainly composed of a position control circuit 51, a speed control circuit 53 and a current control circuit 55.

For angular indexing of the circular table 15, a control unit (not shown) of the machine tool outputs a position command signal representing a target rotational position Pc of the servomotor M to the position control circuit 51. The position command signal represents a rotational position for obtaining the amount of rotation of the servomotor M corresponding to the amount of rotation of the circular table 15 to be rotated next time, by way of numerical control programmed in the control unit of the machine tool.

The position control circuit 51 includes a comparator 51a. The comparator 51a receives the above-mentioned position command signal representing the target rotational position Pc. The comparator 51a also receives a position feedback signal from an encoder EN provided at the servomotor M. The comparator 51a obtains a positional deviation Pd between the target rotational position Pc and an actual rotational position Pf of the servomotor M represented by the position feedback signal. The comparator 51a outputs the obtained positional deviation Pd to a positional deviation amplifier 51b which is provided in the position control circuit 51. The positional deviation amplifier 51b has set therein a position loop gain Gp. The positional deviation amplifier 51b amplifies the positional deviation Pd from the comparator 51a in accordance with the position loop gain Gp to obtain a speed command value Sc. The positional deviation amplifier 51b outputs a speed command signal representing the speed command value Sc to a comparator 53a which is provided in the speed control circuit 53.

The comparator 53a of the speed control circuit 53 receives a speed feedback signal which is obtained from a differentiator 52 in accordance with the amount of rotation of the servomotor M detected by the encoder EN. The comparator 53a obtains a speed deviation Sd between the speed command value Sc represented by the speed command signal from the position control circuit 51 and a rotation speed Sf of the servomotor M represented by the speed feedback signal. The comparator 53a outputs the obtained speed deviation Sd to a speed deviation amplifier 53b.

Figure 4:
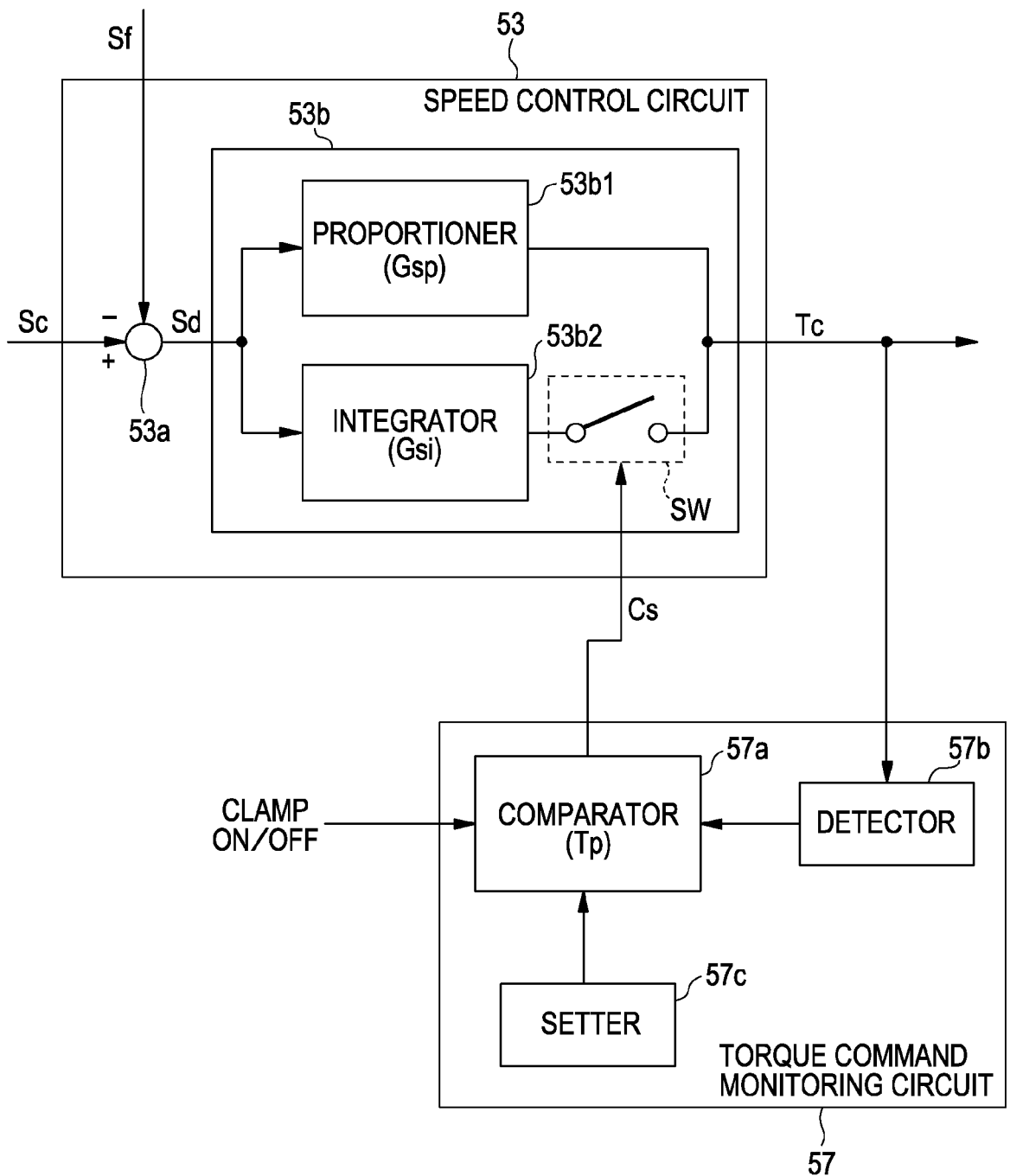
FIG. 4 is a block diagram showing a part of the control unit for implementing the embodiment of the present invention.

The speed deviation amplifier 53b performs proportional-plus-integral (PI) control for the speed deviation Sd from the comparator 53a to obtain a torque command value. As shown in FIG. 4, the speed deviation amplifier 53b includes a proportioner 53b1 having set therein a proportional gain (speed proportional gain) Gsp as a control gain, and an integrator 53b2 having set therein an integral gain (speed integral gain) Gsi as a control gain. The proportioner 53b1 performs proportional (P) control by multiplying the speed deviation Sd by the proportional gain Gsp, and the integrator 53b2 performs integral (I) control by integrating the speed deviation Sd in accordance with the integral gain Gsi. The speed deviation amplifier 53b adds the values obtained by the proportioner 53b1 and integrator 53b2 to obtain a torque command value Tc. The speed deviation amplifier 53b outputs a torque command signal representing the obtained torque command value Tc to a torque controller 55a which is provided in the current control circuit 55.

The current control circuit 55 includes the torque controller 55a, a D/A converter 55b, a current amplifier 55c, and a current detector 55d. The torque controller 55a obtains a current command value Ic on the basis of the torque command Tc from the speed control circuit 53. The torque controller 55a outputs a command signal representing the current command value Ic. The D/A converter 55b converts the command signal representing the current command value Ic into an analog signal, and outputs the analog signal to the current amplifier 55c. The current amplifier 55c calculates a deviation between a current value I detected by the current detector 55d and the current command value Ic from the D/A converter 55b. The current amplifier 55c supplies the servomotor M with driving current corresponding to the deviation. The driving current allows the servomotor M to be rotated to the target rotational position Pc represented by the position command signal from the machine tool.

In this embodiment as described above, the control unit 50 includes a torque command monitoring circuit 57 that monitors the torque command value Tc from the speed control circuit 53. Also, the speed deviation amplifier 53b of the speed control circuit 53 has a switch circuit SW arranged at the output side of the integrator 53b2, to switch the content of control.

The torque command monitoring circuit 57 includes a detector 57b that detects a torque command value, a setter 57c that sets a permissible torque value for the torque command value, and a comparator 57a that compares the detected torque command value with the set permissible torque value. The comparator 57a also receives a clamp-ON signal representing that the clamping mechanism 30 is in operation, and a clamp-OFF signal representing that the clamping is released.

The detector 57b is connected to the output side of the speed deviation amplifier 53b of the speed control circuit 53. The detector 57b detects the torque command value Tc from the torque command signal output from the speed deviation amplifier 53b every predetermined sampling period, and outputs the detected value (torque command value Tc) to the comparator 57a.

The comparator 57a has set therein a permissible torque value Tp for the torque command value, the permissible torque value Tp being set by the setter 57c. For example, set permissible torque value Tp is set to about 70% of a rating torque of the servomotor M. The comparator 57a performs monitoring operation in which the torque command value Tc detected by the detector 57b is compared with the permissible torque value Tp every time when the detector 57b outputs the detected value. At the time when it is determined that the detected torque command value Tc is equal to or greater than the permissible torque value Tp, the comparator 57a outputs a switch signal Cs to the switch circuit SW of the speed deviation amplifier 53b so as to switch the state between the open state and closed state. Assume that the monitoring operation of the comparator 57a starts when the clamp-ON signal is input, and terminates when the claim-OFF signal is input.

The switch signal Cs from the comparator 57a to the switch circuit SW of the speed deviation amplifier 53b is continuously output from when the output is started until when the comparator 57a receives the clamp-OFF signal. The switch circuit SW is a normally closed contact, and becomes the open state when receiving the switch signal Cs from the comparator 57a.

With the control unit 50 of the servomotor M having the above-described configuration, during angular indexing of the circular table 15, the speed control circuit 53 performs the PI control for the speed deviation Sd to obtain the torque command value Tc, and the current control circuit 55 drives the servomotor M on the basis of the torque command value Tc. As described above, in order to obtain the torque command value Tc on the basis of the speed deviation Sd corresponding to the positional deviation Pd during angular indexing, the I control in which the speed deviation Sd is integrated in accordance with the integral gain is performed in addition to the P control in which the speed deviation Sd is amplified in accordance with the proportional gain Gsp, and the torque command value Tc is obtained by adding the integral value to the value of the P control. Accordingly, the servomotor M can be rotated to the target rotational position Pc with a high responsibility since the position command signal is generated. Though not shown, it is assumed that the clamp-OFF signal is also input to the integrator 53b2, and the clamp-OFF signal clears the integral value of the integrator 53b2.

When indexing of the angular position of the circular table 15 is completed, and an operation command for holding the angular position is output to the clamping mechanism 30 or clamping is completed, the clamp-ON signal is output to the comparator 57a of the torque command monitoring circuit 57, the clamp-ON signal representing that the clamping mechanism 30 is in operation. Then, the comparator 57a starts the monitoring operation in which the torque command value Tc detected by the detector 57b is compared with the set permissible torque value Tp. Since the switch signal Cs is not output from the comparator 57a at this time, the switch circuit SW of the speed deviation amplifier 53b is held in the closed state.

When the clamping mechanism 30 has completed holding of the angular position of the circular table 15, processing of a workpiece mounted on the circular table 15 is started. During the operation of the clamping mechanism 30, a rotational force may be applied to the circular table 15, for example, by a load against the workpiece, and thus the angular position of the held circular table 15 may be deviated from the target angular position. In this case, a deviation (positional deviation Pd) may be generated between the target rotational position Pc represented by the position command signal from the machine tool, and the rotational position of the servomotor M detected by the encoder EN. So, the control unit 50 starts the position control for restoring the rotational position of the servomotor M to the target rotational position Pc in accordance with the positional deviation Pd.

In the control process, since the torque command value Tc from the speed control circuit 53 is smaller than the permissible torque value Tp set in the comparator 57a at the time when the control is started, the switch circuit SW of the speed deviation amplifier 53b is held in the closed state. Accordingly, the speed control circuit 53 performs the PI control for the speed deviation Sd to obtain the torque command value Tc and outputs the obtained value Tc, in a manner similar to that during angular indexing.

In the above control process, however, since the clamping force of the clamping mechanism 30 is continuously applied to the indexing mechanism 20 (clamp disc 31) so as to stop the rotation of the main shaft 13 and circular table 15, the servomotor M has to be rotated with a large load due to the clamping force applied. Owing to this, in the PI control, the integral value of the I control increases and the torque command value Tc becomes excessive. This may increase the output torque of the servomotor M, causing the servomotor M to become an overload state.

In contrast, with the control unit 50 of this embodiment, the torque command monitoring circuit 57 monitors the torque command value Tc output from the speed control circuit 53b, and the content of control of the speed deviation amplifier 53b is switched from the PI control to the P control depending on the result of monitoring.

In particular, in the torque command monitoring circuit 57, the comparator 57a compares the torque command value Tc detected by the detector 57b with the permissible torque value Tp. When it is determined that the torque command value Tc is equal to or greater than the permissible torque value Tp, the comparator 57a outputs the switch signal Cs to the switch circuit SW of the speed deviation amplifier 53b at the time, and the switch circuit SW is switched to the open state in accordance with the switch signal Cs. As a result, the torque command value Tc output from the speed deviation amplifier 53b becomes a value obtained by performing only the P control for the speed deviation Sd corresponding to the positional deviation Pd, the value being smaller than the torque command value Tc obtained by performing the PI control for the equivalent positional deviation Pd.

That is, if the torque command value Tc is equal to or greater than the permissible torque value Tp during the operation of the clamping mechanism 30, the control unit 50 of this embodiment controls the servomotor M by switching the content of control from the PI control performed for angular indexing to the P control which provides the torque command value smaller than that of the PI control for the equivalent positional deviation. Accordingly, the output torque of the servomotor M becomes smaller than that during angular indexing by the control for the equivalent positional deviation, thereby preventing the servomotor M from becoming the overload state.

After the content of control is switched as described, the current control circuit 55 controls the drive of the servomotor M on the basis of the torque command value Tc obtained by performing only the P control for the speed deviation Sd by the speed control circuit 53, so as to rotate the servomotor M to the target rotational position. With this control, the angular position of the circular table 15 deviated from the target angular position corresponds to the target angular position, thereby preventing the processing of a workpiece from being continued while a deviation is left at the angular position of the circular table 15.

In the above embodiment, while the control unit 50 has the torque command monitoring circuit 57, the torque command monitoring circuit 57 monitors the torque command value Tc for controlling the drive of the servomotor M during the operation of the clamping mechanism 30, and the torque command monitoring circuit 57 switches the content of control at the time when it is determined that the torque command value Tc is equal to or greater than the set permissible torque value, the present invention is not limited thereto. The torque command monitoring circuit 57 may monitor the current command value Ic of the current control circuit 55 and switch the content of control at the time when the current command value Ic is equal to or greater than a permissible current value.

Also, the content of control may be switched according to the clamp-ON signal representing that the clamping mechanism 30 is in operation and the clamp-OFF signal representing that clamping is released, instead of switching the content of control on the basis of the determination whether the torque command value or the current command value is equal to or greater than the permissible value. That is, the content of control may be switched in association with the ON/OFF state of clamping of the clamping mechanism 30. In such a case, concerning the above embodiment, the torque command monitoring circuit 57 of the control unit 50 may be omitted, and the control unit 50 may be configured such that the clamp-ON signal and the clamp-OFF signal are input to the switch circuit SW of the speed deviation amplifier 53b, so that the switch circuit SW is switched between the open and closed states according to the clamp-ON signal and the clamp-OFF signal.

In the above embodiment, while the output torque of the servomotor M is controlled to be smaller than the output torque during angular indexing by the control for the equivalent positional deviation by switching the content of control for obtaining the torque command value from the PI control to the P control, the present invention is not limited thereto. A similar advantage can be obtained by changing the control gain to a smaller value instead of the above switching operation.

Figure 5:
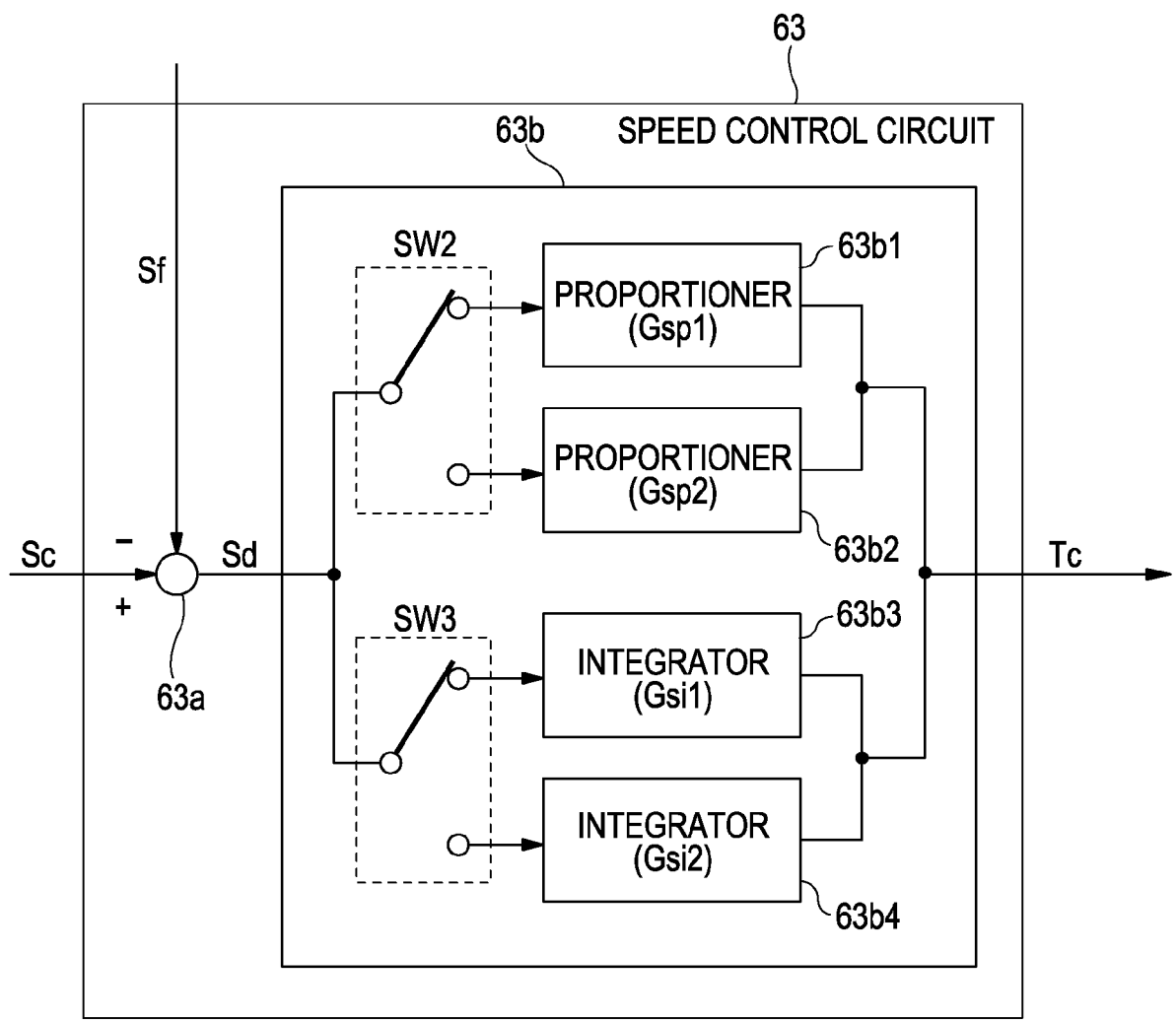
FIG. 5 is a block diagram showing a part of a control unit for implementing another embodiment of the present invention.
Figure 6:
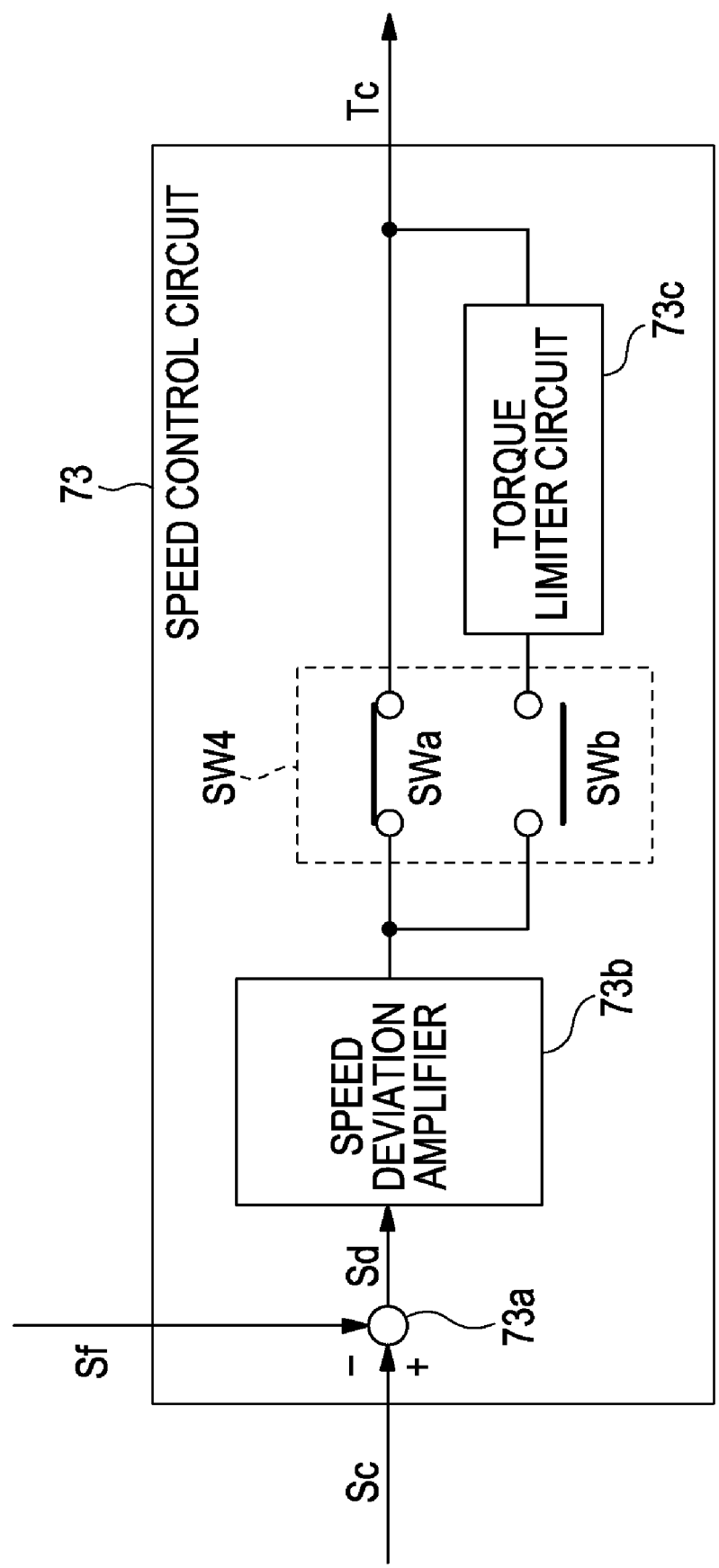
FIG. 6 is a block diagram showing a part of a control unit for implementing still another embodiment of the present invention.

In particular, as shown in FIG. 5, a speed deviation amplifier 63b of a speed control circuit 63 includes proportioners 63b1 and 63b2, integrators 63b3 and 63b4, and switch circuits SW2 and SW3. The proportioners 63b1 and 63b2 are provided as the proportioner and respectively have different proportional gains Gsp1 and Gsp2 (Gsp1>Gsp2). The integrators 63b3 and 63b4 are provided as the integrator and respectively have different integral gains Gsi1 and Gsi2 (Gsi1>Gsi2). The switch circuits SW2 and SW3 switch the operation between the proportioners 63b1 and 63b2, and the operation between the integrators 63b3 and 63b4, respectively. The switch circuits SW2 and SW3 are in the illustrated states during angular indexing of the circular table 15. A speed deviation Sd is input from a comparator 63a to the proportioner 63b1 and the integrator 63b3. Also, the switch circuits SW2 and SW3 receive the switch signal Cs or one of the clamp-ON signal and clamp-OFF signal (not shown).

When receiving the switch signal Cs or one of the clamp-ON signal and clamp-OFF signal, the switch circuits SW2 and SW3 switch the contacts to the proportioner 63b2 and the integrator 63b4. As a result, the torque command value Tc output from the speed deviation amplifier 63b can be obtained by the PI control using smaller control gains (proportional and integral gains) than those used for angular indexing, thereby controlling the output torque of the servomotor M to be small and providing a similar advantage to that of the above embodiment.

In the embodiment of FIG. 5, the number of proportioners (proportional gains) may be one, and only the number of integrators (integral gains) may be two, so that only the integrator is switched when the clamping mechanism is in operation. Alternatively, instead of the configuration containing the two integrators (and proportioners) each having different control gains, one integrator (and one proportioner) may have two control gains, and the control gains used for the I control (and for the P control) may be switched according to the switch signal Cs or one of the clamp-ON signal and the clamp-OFF signal.

Further, the present invention is not limited to the configuration of the embodiment in which the content of control is switched so that the torque command value output from the speed deviation amplifier 53b of the speed control circuit 53 becomes small. An upper limit value may be set for the torque command value Tc applied to the current control circuit to control the output torque of the servomotor M to be small.

For example, such a configuration in which the upper limit value is set for the torque command value Tc may be one in which a torque limiter circuit 73c as a torque limiting unit is provided between a speed deviation amplifier 73b of a speed control circuit 73 and a current control circuit (in the illustrated embodiment, at the downstream of the speed deviation amplifier 73b of the speed control circuit 73).

In particular, in the speed control circuit 73, the output of the speed deviation amplifier 73b is input to the current control circuit 55 via a normally closed contact SWa of a switch circuit SW4, and a series circuit composed of a normally open contact SWb of the switch circuit SW4 and the torque limiter circuit 73c is connected in parallel. When the switch signal Cs or one of the clamp-ON signal and the clamp-OFF signal is input to the switch circuit SW4, the normally closed contact SWa becomes the open state, and the normally open contact SWb becomes the closed state. The output of the speed deviation amplifier 73b is output to the current control circuit via the torque limiter circuit 73c. It is assumed that a torque limiter circuit 53c has a torque limit value (for example, a value of about 70% of a rating torque) set such that the output torque of the servomotor M does not become excessive.

Accordingly, during the operation of the clamping mechanism 30, the control unit performs the position control, and during the control process, the torque command value Tc output to the current control circuit can be restricted to the torque limit value set in the torque limiter circuit 73c and inhibited from becoming greater than the torque limit value even when the torque command value from a comparator 73a obtained by performing the PI control for the speed deviation Sd becomes excessive. This can prevent the output torque of the servomotor M from becoming excessive, thereby obtaining a similar advantage to that of the above embodiment.

It should be noted that the present invention is not limited to the above-described embodiments, and may be modified within the scope of the present invention.

What is claimed is:

1. A method of controlling drive of a driving motor for a rotary indexing device of a machine tool, the rotary indexing device including an indexing mechanism that indexes an angular position of a circular table by rotating the circular table with the use of a driving motor as a driving source, a clamping mechanism that holds the indexed angular position, and a control unit that controls the drive of the driving motor by position control, the method being performed by the control unit, the method comprising the step of:

controlling the drive of the driving motor during operation of the clamping mechanism with a content of control in which an output torque of the driving motor by the position control becomes smaller than an output torque by the position control during indexing of the angular position of the circular table for an equivalent positional deviation.

2. The method according to claim 1, wherein the control unit detects a torque command value obtained by proportional-plus-integral control, and switches the content of control on the basis of the detected value.

3. The method according to claim 2, wherein the control unit controls the drive of the driving motor by switching the content of control for obtaining the torque command value from the proportional-plus-integral control to proportional control.

4. The method according to claim 2, wherein the control unit controls the drive of the driving motor by changing a control gain for the position control to a value causing the output torque of the driving motor to be small.

5. The method according to claim 2, wherein the control unit includes a torque limiting unit configured to set an upper limit value for the torque command value, and controls the drive of the driving motor with the content of control in which a limit is applied to the torque command value.

6. The method according to claim 1, wherein the control unit switches the content of control on the basis of an operation command for the clamping mechanism.

7. The method according to claim 6, wherein the control unit controls the drive of the driving motor by switching the content of control for obtaining the torque command value from the proportional-plus-integral control to proportional control.

8. The method according to claim 6, wherein the control unit controls the drive of the driving motor by changing a control gain for the position control to a value causing the output torque of the driving motor to be small.

9. The method according to claim 6, wherein the control unit includes a torque limiting unit configured to set an upper limit value for the torque command value, and controls the drive of the driving motor with the content of control in which a limit is applied to the torque command value.

10. The method according to claim 1, wherein the control unit controls the drive of the driving motor by switching the content of control for obtaining the torque command value from the proportional-plus-integral control to proportional control.

11. The method according to claim 1, wherein the control unit controls the drive of the driving motor by changing a control gain for the position control to a value causing the output torque of the driving motor to be small.

12. The method according to claim 1, wherein the control unit includes a torque limiting unit configured to set an upper limit value for the torque command value, and controls the drive of the driving motor with the content of control in which a limit is applied to the torque command value.

* * * * *